US012122716B2

(12) United States Patent
Oram et al.

(10) Patent No.: US 12,122,716 B2
(45) Date of Patent: Oct. 22, 2024

(54) GLASS-BASED ARTICLES WITH FRACTURE RESISTANT STRESS PROFILES

(71) Applicant: CORNING INCORPORATED, Corning, NY (US)

(72) Inventors: Pascale Oram, Hammondsport, NY (US); Rostislav Vatchev Roussev, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 902 days.

(21) Appl. No.: 17/100,251

(22) Filed: Nov. 20, 2020

(65) Prior Publication Data

US 2021/0155533 A1 May 27, 2021

Related U.S. Application Data

(60) Provisional application No. 62/941,506, filed on Nov. 27, 2019.

(51) Int. Cl.
  *C03C 4/18* (2006.01)
  *C03C 3/097* (2006.01)
  *C03C 21/00* (2006.01)
  *H05K 5/00* (2006.01)

(52) U.S. Cl.
  CPC ............... *C03C 4/18* (2013.01); *C03C 3/097* (2013.01); *C03C 21/002* (2013.01); *C03C 2204/00* (2013.01)

(58) Field of Classification Search
  None
  See application file for complete search history.

(56) References Cited

U.S. PATENT DOCUMENTS

| 8,854,623 | B2 | 10/2014 | Fontaine et al. |
| 2017/0197384 | A1 | 7/2017 | Finkeldey et al. |
| 2017/0295657 | A1* | 10/2017 | Gross .................... C03C 21/002 |
| 2017/0305786 | A1 | 10/2017 | Roussev et al. |
| 2018/0105461 | A1* | 4/2018 | Schneider ............... C03C 17/30 |
| 2018/0148369 | A1 | 5/2018 | Gross et al. |
| 2019/0106353 | A1 | 4/2019 | Rai et al. |
| 2019/0161386 | A1 | 5/2019 | Gross et al. |
| 2019/0161390 | A1 | 5/2019 | Gross et al. |
| 2019/0208652 | A1 | 7/2019 | Gross et al. |
| 2019/0389764 | A1* | 12/2019 | Andrews ............. C03C 10/0018 |

FOREIGN PATENT DOCUMENTS

| WO | 2019/127818 A1 | 7/2019 |
| WO | 2020/069259 A1 | 4/2020 |
| WO | 2020/069260 A1 | 4/2020 |

OTHER PUBLICATIONS

International Search Report and Written Opinion of the International Searching Authority; PCT/US2020/060124; mailed on Feb. 25, 2021, 12 pages; European Patent Office.

* cited by examiner

*Primary Examiner* — David Sample
(74) *Attorney, Agent, or Firm* — Payal Patel

(57) ABSTRACT

Glass-based articles comprise stress profiles providing improved fracture resistance and decreased weight gain. The glass-based articles are produced with a single-step ion exchange process.

20 Claims, 8 Drawing Sheets

GLASS-BASED ARTICLES WITH FRACTURE RESISTANT STRESS PROFILES

This application claims the benefit of priority of U.S. Provisional Application Ser. No. 62/941,506 filed on Nov. 27, 2019 the content of which is relied upon and incorporated herein by reference in its entirety.

BACKGROUND

Field

The present specification generally relates to stress profiles for fracture resistant stress profiles in glass-based articles. More specifically, the present specification is directed to stress profiles for glass-based articles, which may be lithium-containing, that may be utilized in electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

It has been a continuous effort for glass makers and handheld device manufacturers to improve the resistance of handheld devices to failure. It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glass-based articles that can be strengthened, such as by ion exchange, and that have the mechanical properties that allow them to be formed as thin articles.

SUMMARY

According to aspect (1), a glass-based article is provided. The glass-based article comprises: a first surface and a second surface defining a thickness t, wherein t is greater than or equal to 0.2 mm to less than or equal to 2.0 mm; a peak tension PT of greater than or equal to 21 MPa; a compressive stress CS of greater than or equal to 650 MPa to less than or equal to 1200 MPa; a depth of layer of a spike $DOL_{SP}$ of greater than or equal to 4.5 μm to less than or equal to 12.0 μm; and a compressive stress at a knee $CS_K$ of greater than or equal to 15 MPa to less than or equal to 150 MPa.

According to aspect (2), the glass-based article of aspect (1) is provided, wherein the glass-based article is formed with a single ion exchange process.

According to aspect (3), the glass-based article of any of aspect (1) to the preceding aspect is provided, wherein the PT is less than or equal to 80 MPa.

According to aspect (4), the glass-based article of any of aspect (1) to the preceding aspect is provided, wherein the PT is greater than or equal to 43 MPa to less than or equal to 78 MPa.

According to aspect (5), the glass-based article of any of aspect (1) to the preceding aspect is provided, wherein the CS is greater than or equal to 800 MPa to less than or equal to 1050 MPa.

According to aspect (6), the glass-based article of any of aspect (1) to the preceding aspect is provided, wherein the $DOL_{SP}$ is greater than or equal to 6.0 μm to less than or equal to 11.5 μm.

According to aspect (7), the glass-based article of any of aspect (1) to the preceding aspect is provided, wherein the $CS_K$ is greater than or equal to 30 MPa to less than or equal to 125 MPa.

According to aspect (8), the glass-based article of any of aspect (1) to the preceding aspect is provided, wherein $DOL_{SP}/t$ is greater than or equal to 0.010 to less than or equal to 0.030.

According to aspect (9), the glass-based article of any of aspect (1) to the preceding aspect is provided, further comprising a depth of compression DOC, wherein the DOC is greater than or equal to 0.11t.

According to aspect (10), the glass-based article of any of aspect (1) to the preceding aspect is provided, further comprising a stress-depth integral in a tensile stress zone A, and A/(PT*t) is greater than or equal to 0.4.

According to aspect (11), the glass-based article of any of aspect (1) to the preceding aspect is provided, further comprising a stress-depth integral in a tensile stress zone A, and A/(PT*t) is less than or equal to 0.71.

According to aspect (12), the glass-based article of any of aspect (1) to the preceding aspect is provided, further comprising a stress-depth integral in a tensile stress zone A, and A/t is greater than or equal to 16 MPa.

According to aspect (13), the glass-based article of any of aspect (1) to the preceding aspect is provided, further comprising a stress-depth integral in a tensile stress zone A, and A/t is less than or equal to 22 MPa.

According to aspect (14), the glass-based article of any of aspect (1) to the preceding aspect is provided, further comprising a stress-depth integral in a tensile stress zone A, and $A/t^{3/2}$ is greater than or equal to 24 MPa/mm$^{1/2}$.

According to aspect (15), the glass-based article of any of aspect (1) to the preceding aspect is provided, further comprising a stress-depth integral in a tensile stress zone A, and $A/t^{3/2}$ is less than or equal to 43 MPa/mm$^{1/2}$.

According to aspect (16), the glass-based article of any of aspect (1) to the preceding aspect is provided, wherein PT/(E*t) is less than or equal to 2.2 m$^{-1}$, and E is the Young's modulus of a glass-based substrate having the same composition and microstructure as the center of the glass-based article.

According to aspect (17), the glass-based article of any of aspect (1) to the preceding aspect is provided, wherein PT/(E*t) is greater than or equal to 0.8 m$^{-1}$, and E is the Young's modulus of a glass-based substrate having the same composition and microstructure as the center of the glass-based article.

According to aspect (18), the glass-based article of any of aspect (1) to the preceding aspect is provided, further comprising a stress-depth integral in a tensile stress zone A, and $A/(E*t)$ is less than or equal to $9 \times 10^{-4}$, and E is the Young's modulus of a glass-based substrate having the same composition and microstructure as the center of the glass-based article.

According to aspect (19), the glass-based article of any of aspect (1) to the preceding aspect is provided, further comprising a stress-depth integral in a tensile stress zone A, and $A/(E*t)$ is greater than or equal to $3.5 \times 10^{-4}$, and E is the Young's modulus of a glass-based substrate having the same composition and microstructure as the center of the glass-based article.

According to aspect (20), the glass-based article of any of aspect (1) to the preceding aspect is provided, wherein t is less than or equal to 0.65 mm and PT is less than or equal to 60 MPa.

According to aspect (21), the glass-based article of any of aspect (1) to the preceding aspect is provided, wherein t is greater than or equal to 0.3 mm to less than or equal to 0.8 mm.

According to aspect (22), the glass-based article of any of aspect (1) to the preceding aspect is provided, wherein t is greater than or equal to 0.4 mm to less than or equal to 0.6 mm.

According to aspect (23), the glass-based article of any of aspect (1) to the preceding aspect is provided, wherein a ratio of the molar concentration of $Li_2O$ to the molar concentration of $Na_2O$ at the center of the glass-based article is less than or equal to 2.0.

According to aspect (24), the glass-based article of any of aspect (1) to the preceding aspect is provided, wherein the $Li_2O$ concentration at the center of the glass-based article is less than or equal to 12 mol %.

According to aspect (25), a glass-based article is provided. The glass-based article comprises: a first surface and a second surface defining a thickness t, wherein t is greater than or equal to 0.2 mm to less than or equal to 2.0 mm; a peak tension PT of greater than or equal to 21 MPa; a compressive stress CS of greater than or equal to 650 MPa to less than or equal to 1200 MPa; a depth of layer of a spike $DOL_{SP}$, wherein $DOL_{SP}/t$ is greater than or equal to 0.007 to less than or equal to 0.030; and a compressive stress at a knee $CS_K$ of greater than or equal to 15 MPa to less than or equal to 150 MPa.

According to aspect (26), the glass-based article of aspect (25) is provided, wherein the glass-based article is formed with a single ion exchange process.

According to aspect (27), the glass-based article of any of aspect (25) to the preceding aspect is provided, wherein the PT is less than or equal to 80 MPa.

According to aspect (28), the glass-based article of any of aspect (25) to the preceding aspect is provided, wherein the PT is greater than or equal to 43 MPa to less than or equal to 78 MPa.

According to aspect (29), the glass-based article of any of aspect (25) to the preceding aspect is provided, wherein the CS is greater than or equal to 800 MPa to less than or equal to 1050 MPa.

According to aspect (30), the glass-based article of any of aspect (25) to the preceding aspect is provided, wherein the $DOL_{SP}$ is greater than or equal to 6.0 μm to less than or equal to 11.5 μm.

According to aspect (31), the glass-based article of any of aspect (25) to the preceding aspect is provided, wherein the $CS_K$ is greater than or equal to 30 MPa to less than or equal to 125 MPa.

According to aspect (32), the glass-based article of any of aspect (25) to the preceding aspect is provided, wherein $DOL_{SP}/t$ is greater than or equal to 0.010 to less than or equal to 0.029.

According to aspect (33), the glass-based article of any of aspect (25) to the preceding aspect is provided, further comprising a depth of compression DOC, wherein the DOC is greater than or equal to 0.11t.

According to aspect (34), the glass-based article of any of aspect (25) to the preceding aspect is provided, further comprising a stress-depth integral in a tensile stress zone A, and $A/(PT*t)$ is greater than or equal to 0.4.

According to aspect (35), the glass-based article of any of aspect (25) to the preceding aspect is provided, further comprising a stress-depth integral in a tensile stress zone A, and $A/(PT*t)$ is less than or equal to 0.71.

According to aspect (36), the glass-based article of any of aspect (25) to the preceding aspect is provided, further comprising a stress-depth integral in a tensile stress zone A, and $A/t$ is greater than or equal to 16 MPa.

According to aspect (37), the glass-based article of any of aspect (25) to the preceding aspect is provided, further comprising a stress-depth integral in a tensile stress zone A, and $A/t$ is less than or equal to 22 MPa.

According to aspect (38), the glass-based article of any of aspect (25) to the preceding aspect is provided, further comprising a stress-depth integral in a tensile stress zone A, and $A/t^{3/2}$ is greater than or equal to 24 $MPa/mm^{1/2}$.

According to aspect (39), the glass-based article of any of aspect (25) to the preceding aspect is provided, further comprising a stress-depth integral in a tensile stress zone A, and $A/t^{3/2}$ is less than or equal to 43 $MPa/mm^{1/2}$.

According to aspect (40), the glass-based article of any of aspect (25) to the preceding aspect is provided, wherein $PT/(E*t)$ is less than or equal to 2.2 $m^{-1}$, and E is the Young's modulus of a glass-based substrate having the same composition and microstructure as the center of the glass-based article.

According to aspect (41), the glass-based article of any of aspect (25) to the preceding aspect is provided, wherein $PT/(E*t)$ is greater than or equal to 0.8 $m^{-1}$, and E is the Young's modulus of a glass-based substrate having the same composition and microstructure as the center of the glass-based article.

According to aspect (42), the glass-based article of any of aspect (25) to the preceding aspect is provided, further comprising a stress-depth integral in a tensile stress zone A, and $A/(E*t)$ is less than or equal to $9 \times 10^{-4}$, and E is the Young's modulus of a glass-based substrate having the same composition and microstructure as the center of the glass-based article.

According to aspect (43), the glass-based article of any of aspect (25) to the preceding aspect is provided, further comprising a stress-depth integral in a tensile stress zone A, and $A/(E*t)$ is greater than or equal to $3.5 \times 10^{-4}$, and E is the Young's modulus of a glass-based substrate having the same composition and microstructure as the center of the glass-based article.

According to aspect (44), the glass-based article of any of aspect (25) to the preceding aspect is provided, wherein t is less than or equal to 0.65 mm and PT is less than or equal to 60 MPa.

According to aspect (45), the glass-based article of any of aspect (25) to the preceding aspect is provided, wherein t is greater than or equal to 0.3 mm to less than or equal to 0.8 mm.

According to aspect (46), the glass-based article of any of aspect (25) to the preceding aspect is provided, wherein t is greater than or equal to 0.4 mm to less than or equal to 0.6 mm.

According to aspect (47), the glass-based article of any of aspect (25) to the preceding aspect is provided, wherein a ratio of the molar concentration of $Li_2O$ to the molar concentration of $Na_2O$ at the center of the glass-based article is less than or equal to 2.0.

According to aspect (48), the glass-based article of any of aspect (25) to the preceding aspect is provided, wherein the $Li_2O$ concentration at the center of the glass-based article is less than or equal to 12 mol %.

According to aspect (49), a consumer electronic product is provided. The consumer electronic product comprises: a housing comprising a front surface, a back surface, and side surfaces; electrical components provided at least partially within the housing, the electrical components comprising at least a controller, a memory, and a display, the display being provided at or adjacent the front surface of the housing; and a cover disposed over the display. At least a portion of at least one of the housing and the cover comprises the glass-based article of any of the preceding aspects.

According to aspect (50), a method is provided. The method comprises exposing a glass-based substrate to an ion exchange bath to form a glass-based article. The glass-based substrate comprises a first surface and a second surface defining a thickness t, wherein t is greater than or equal to 0.2 mm to less than or equal to 2.0 mm. The glass-based article includes: a peak tension PT of greater than or equal to 21 MPa; a compressive stress CS of greater than or equal to 650 MPa to less than or equal to 1200 MPa; a depth of layer of a spike $DOL_{SP}$ of greater than or equal to 4.5 µm to less than or equal to 12.0 µm; and a compressive stress at a knee $CS_K$ of greater than or equal to 15 MPa to less than or equal to 150 MPa; and the ion exchange bath comprises potassium and sodium.

According to aspect (51), a method is provided. The method comprises exposing a glass-based substrate to an ion exchange bath to form a glass-based article. The glass-based substrate comprises a first surface and a second surface defining a thickness t, wherein t is greater than or equal to 0.2 mm to less than or equal to 2.0 mm. The glass-based article includes: a peak tension PT of greater than or equal to 21 MPa; a compressive stress CS of greater than or equal to 650 MPa to less than or equal to 1200 MPa; a depth of layer of a spike $DOL_{SP}$, wherein $DOL_{SP}/t$ is greater than or equal to 0.007 to less than or equal to 0.030; and a compressive stress at a knee $CS_K$ of greater than or equal to 15 MPa to less than or equal to 150 MPa; and the ion exchange bath comprises potassium and sodium.

According to aspect (52), the method of any of aspect (50) to the preceding aspect is provided, wherein the method does not include any additional ion exchange treatment.

According to aspect (53), the method of any of aspect (50) to the preceding aspect is provided, wherein the ion exchange bath is at a temperature of greater than or equal to 370° C. to less than or equal to 450° C.

According to aspect (54), the method of any of aspect (50) to the preceding aspect is provided, wherein the ion exchange bath is at a temperature of greater than or equal to 380° C. to less than or equal to 420° C.

According to aspect (55), the method of any of aspect (50) to the preceding aspect is provided, wherein the ion exchange bath is at a temperature of greater than or equal to 380° C. to less than or equal to 390° C.

According to aspect (56), the method of any of aspect (50) to the preceding aspect is provided, wherein the ion exchange bath comprises $NaNO_3$ in an amount greater than or equal to 1 wt % to less than or equal to 10 wt %.

According to aspect (57), the method of any of aspect (50) to the preceding aspect is provided, wherein the ion exchange bath comprises $NaNO_3$ in an amount greater than or equal to 4 wt % to less than or equal to 9 wt %.

According to aspect (58), the method of any of aspect (50) to the preceding aspect is provided, wherein the exposing extends for a period of greater than or equal to 15 minutes to less than or equal to 200 minutes.

According to aspect (59), the method of any of aspect (50) to the preceding aspect is provided, wherein the exposing extends for a period of greater than or equal to 65 minutes to less than or equal to 180 minutes.

According to aspect (60), the method of any of aspect (50) to the preceding aspect is provided, wherein the glass-based substrate comprises a ratio of the molar concentration of $Li_2O$ to the molar concentration of $Na_2O$ of less than or equal to 2.0.

According to aspect (61), the method of any of aspect (50) to the preceding aspect is provided, wherein the glass-based substrate comprises a $Li_2O$ concentration of less than or equal to 12 mol %.

According to aspect (62), the method of any of aspect (50) to the preceding aspect is provided, wherein the glass-based article has a weight gain of less than or equal to 1% when compared to the glass-based substrate.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
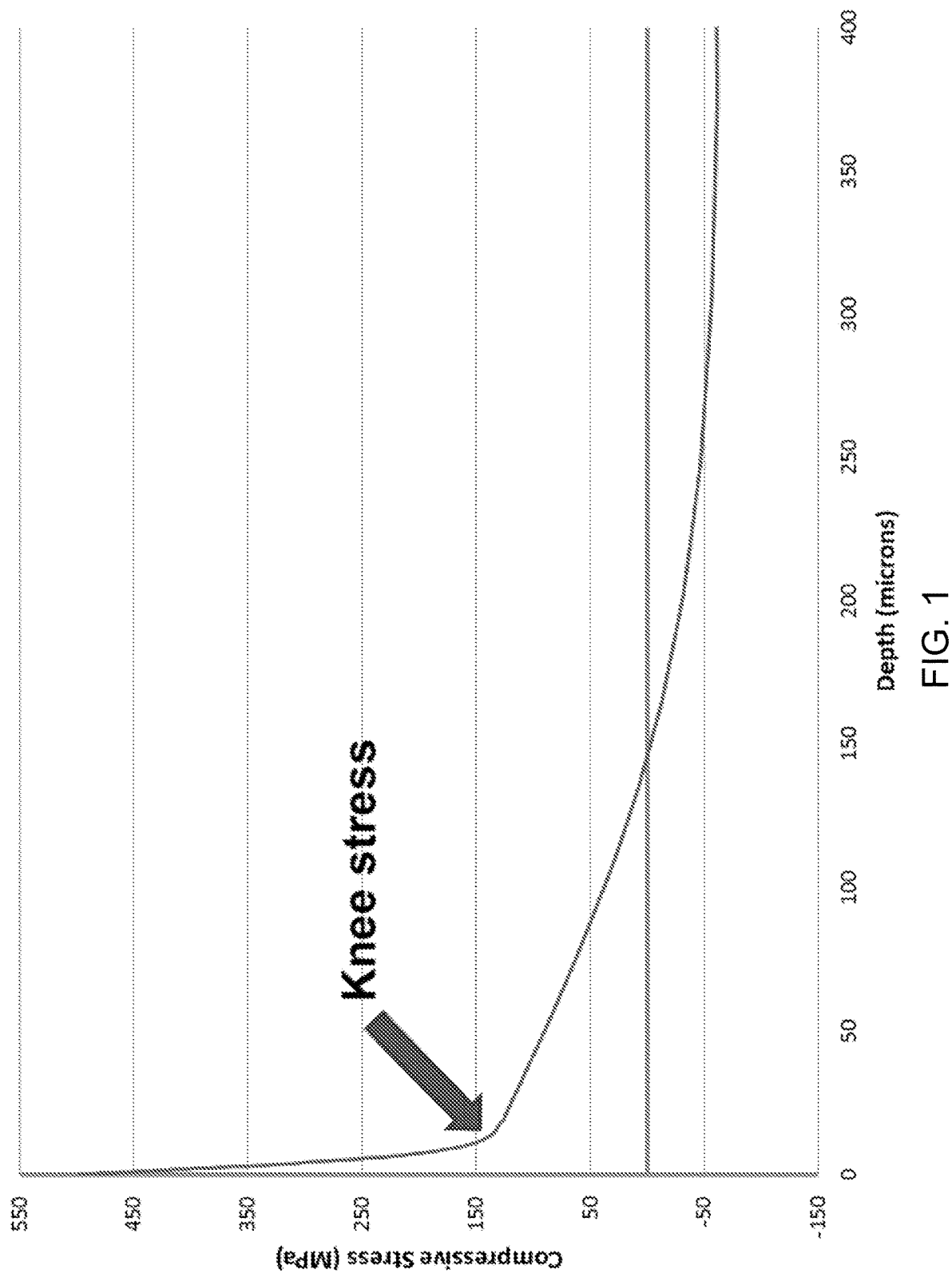
FIG. 1 is a schematic representation of a stress profile including a knee stress.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Generally, a glass-based substrate is subjected to an ion exchange treatment to form a glass-based article. Laminated glass-based articles include laminates of glass materials, laminates of glass and non-glass materials, and/or laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX. Stated differently a glass-based substrate has the base composition prior to being subjected to ion exchange treatment. The center of a glass-based article that has been IOX treated is the least impacted by the IOX treatment and may not be affected by the IOX treatment. For this reason, the composition at the center of the glass-based article may be the same as the base composition when IOX treatment conditions are such that ions supplied for IOX do not diffuse into the center of the substrate. In one or more embodiments, a central composition at the center of the glass article comprises the base composition. Additionally, a glass-based substrate having the same composition and microstructure as the center of the glass-based article may have equivalent properties to the substrate utilized to form the glass-based article.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of depth across the thickness of a glass-based article. A compressive stress region extends from a first surface to a depth of compression (DOC) of the article, where the article is under compressive stress. A central tension region extends from the DOC to include the region where the article is under tensile stress. Stated differently, a first compressive stress region may extend from a first surface to a first depth of compression ($DOC_1$), a tension region extending from $DOC_1$ to a second depth of compression ($DOC_2$), and a second compression region extending from $DOC_2$ to the second surface. In embodiments where the stress profile is symmetric, the distance from each surface to the respective DOC is equal.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|. Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension occurs in the central tension region nominally at 0.5•t, where t is the article thickness, which allows for variation from exact center of the location of the maximum tensile stress. Peak tension (PT) refers to the maximum tension measured, which may or may not be at the center of the article.

A "knee" of a stress profile is a depth of an article where the slope of the stress profile transitions from steep to gradual. The steep portion of the stress profile extending from the surface into the glass-based article is referred to as the "spike." The knee may refer to a transition area over a span of depths where the slope is changing. The knee compressive stress ($CS_k$) is defined as the value of compressive stress that the deeper portion of the CS profile extrapolates to at the depth of spike ($DOL_{sp}$). The $DOL_{sp}$ is reported as measured by a surface-stress meter by known methods. A schematic representation of a stress profile including a knee stress is provided in FIG. 1.

A non-zero metal oxide concentration that varies from the first surface to a depth of layer with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a depth of layer or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

Unless otherwise specified, CT and CS are expressed herein in MegaPascals (MPa), thickness is express in millimeters and DOC and DOL are expressed in microns (micrometers, or µm).

Compressive stress (including peak CS, $CS_{max}$) and $DOL_{sp}$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. The surfaced stress meter measurements reported herein are provided at a measurement wavelength where the fraction part of the fringe count, for both fringes, is in the range of 0.1 to 0.8, preferably 0.15 to 0.7, wherever possible.

The central tension (CT) and peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

General Overview of Properties of Glass-Based Articles

Glass-based articles herein have stress profiles that are designed to increase the probability of survival after multiple drops onto hard surfaces. High fracture toughness offers new higher levels of fracture resistance when combined with these advantageous stress profiles. The stress profiles and methods utilized to form the glass-based articles are selected to minimize weight gain during the ion exchange process. Warp produced by IOX treatments increases with increasing weight gain. For this reason, the glass-based articles and stress profiles described herein are particularly suitable for applications where warp is problematic. Warp is particularly problematic for articles with a low thickness, especially thicknesses of less than about 0.6 mm, articles with complex shapes, such as watch covers or 3D electronic device covers and housings, and/or when the articles are large, such as tablet or laptop screen covers. In addition, excessive warp may prevent an article from forming a hermetic seal, which is increasingly important in watch and consumer electronic device applications.

The glass-based substrates utilized to form the glass-based articles with stress profiles described herein may be formed from any appropriate material, such as alkali aluminosilicate glasses. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ and/or $NaNO_3$), glasses with high strength, high toughness, and high indentation cracking resistance can be achieved. The shape of the stress profiles achieved through chemical strengthening may impact the drop performance, strength, toughness, and other attributes of the glass-based articles.

Lithium aluminosilicate glasses are particularly desirable for the formation of chemically strengthened glass-based articles, as they provide good physical properties, chemical durability, and ion exchangeability. Through different ion exchange processes, greater peak tension (PT), depth of compression (DOC), and compressive stress (CS) can be achieved. The stress profiles described herein provide increased fracture resistance, and may be preferably applied to lithium containing glass-based articles.

In embodiments of compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

Figure 2:
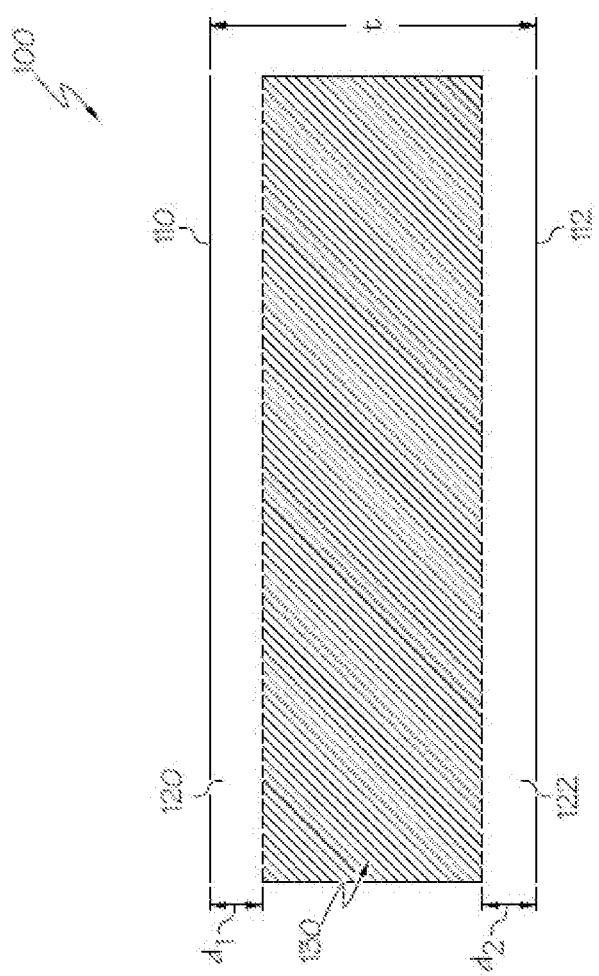
FIG. 2 schematically depicts a cross section of a glass having compressive stress layers on surfaces thereof according to embodiments disclosed and described herein.

The stress profiles disclosed herein exhibit increased fracture resistance, which may be characterized by improved performance in a drop test. With reference to FIG. 2, the glass-based article has a first region under compressive stress (e.g., first and second compressive stress layers 120, 122 in FIG. 2) extending from the surface to a depth of compression (DOC) of the glass and a second region (e.g., central region 130 in FIG. 2) under a tensile stress or central tension (CT) extending from the DOC into the central or interior region of the glass.

The compressive stress (CS) has a maximum or peak value, which typically occurs at the surface of the glass-based article (but such need not be the case as the peak may occur at a depth from the surface of the glass-based article, such as near the surface of the glass), and the CS varies with distance d from the surface according to a function. Referring again to FIG. 2, the first compressive stress layer 120 extends from first surface 110 to a depth $d_1$ and a second compressive stress layer 122 extends from second surface 112 to a depth $d_2$. Together, these segments define a compression or CS of glass-based article 100.

The compressive stress of both major surfaces 110, 112 in FIG. 2 is balanced by stored tension in the central tension region 130 of the glass-based article.

In the glass-based articles described herein, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies, both along a thickness range from about 0•t to about 0.3•t. In some embodiments, the concentration of the alkali metal oxide is non-zero and varies along a thickness range from about 0•t to about 0.35•t, from about 0•t to about 0.4•t, from about 0•t to about 0.45•t, from about 0•t to about 0.48•t, or from about 0•t to about 0.50•t. The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius.

In embodiments, the glass-based article comprises a peak tension (PT) that is greater than or equal to 21 MPa, such as greater than or equal to 25 MPa, greater than or equal to 30 MPa, greater than or equal to 40 MPa, greater than or equal to 43 MPa, greater than or equal to 45 MPa, greater than or equal to 50 MPa, greater than or equal to 55 MPa, greater than or equal to 60 MPa, greater than or equal to 70 MPa, or more. In embodiments, the PT of the glass-based article is less than or equal to 80 MPa, such as less than or equal to 78 MPa, less than or equal to 75 MPa, less than or equal to 70 MPa, less than or equal to 65 MPa, less than or equal to 60 MPa, less than or equal to 55 MPa, less than or equal to 50 MPa, less than or equal to 45 MPa, less than or equal to 40 MPa, less than or equal to 35 MPa, less than or equal to 30 MPa, less than or equal to 25 MPa, or less. The PT may fall within a range formed between any of the aforementioned values. In embodiments, the glass-based article comprises a peak tension (PT) in the range from greater than or equal to 21 MPa to less than or equal to 80 MPa, such as greater than or equal to 25 MPa to less than or equal to 75 MPa, greater than or equal to 30 MPa to less than or equal to 70 MPa, greater than or equal to 35 MPa to less than or equal to 65 MPa, greater than or equal to 40 MPa to less than or equal to 60 MPa, greater than or equal to 45 MPa to less than or equal to 55 MPa, greater than or equal to 43 MPa to less than or equal to 78 MPa, and any ranges or sub-ranges formed between the foregoing endpoints. The PT is correlated with the amount of compressive stress introduced into the glass-based article by the ion exchange treatment. Thus, higher PT values may indicate that more compressive stress has been imparted to the glass-based article, which may allow greater fracture resistance. If the PT value is too high, the glass-based articles may become frangible, which is undesirable for many applications. Additionally, if the glass-based article is thin, which increases the likelihood of IOX induced warp, the upper PT limit may be selected to avoid excessive warp and may be significantly lower than the PT associated with the transition to frangible behavior. In embodiments, the PT for glass-based articles with a thickness of less than or equal to 0.65 mm is less than or equal to 60 MPa, such as less than or equal to 55 MPa, or less.

In one or more embodiments, the glass-based article comprises a peak compressive stress (CS) in the range from greater than or equal to 650 MPa to less than or equal to 1200 MPa, such as greater than or equal to 700 MPa to less than or equal to 1150 MPa, greater than or equal to 750 MPa to less than or equal to 1100 MPa, greater than or equal to 800 MPa to less than or equal to 1050 MPa, greater than or equal to 850 MPa to less than or equal to 1000 MPa, greater than or equal to 900 MPa to less than or equal to 950 MPa, greater than or equal to 800 MPa to less than or equal to 1050 MPa, and all ranges and sub-ranges formed between any of the foregoing endpoints. The peak compressive stress may be located at or near the surface of the glass-based article.

In embodiments, the glass-based article comprises a compressive stress at a knee ($CS_k$) in a range from greater than or equal to 15 MPa to less than or equal to 150 MPa, such as greater than or equal to 30 MPa to less than or equal to 125 MPa, greater than or equal to 20 MPa to less than or equal to 145 MPa, greater than or equal to 25 MPa to less than or equal to 140 MPa, greater than or equal to 30 MPa to less than or equal to 135 MPa, greater than or equal to 35 MPa to less than or equal to 130 MPa, greater than or equal to 40 MPa to less than or equal to 125 MPa, greater than or equal to 45 MPa to less than or equal to 120 MPa, greater than or equal to 50 MPa to less than or equal to 115 MPa, greater than or equal to 55 MPa to less than or equal to 110 MPa, greater than or equal to 60 MPa to less than or equal to 105 MPa, greater than or equal to 65 MPa to less than or equal to 100 MPa, greater than or equal to 70 MPa to less than or equal to 95 MPa, greater than or equal to 75 MPa to less than or equal to 90 MPa, greater than or equal to 85 MPa to less than or equal to 85 MPa, and all ranges and sub-ranges formed between any of the foregoing endpoints. High levels of $CS_k$ are correlated with protection against fracture by the mechanism of sharp-damage introduction combined with bending of the glass-based article simultaneously or after the sharp-damage introduction, such as experienced with a drop on a rough surface.

In embodiments, the glass-based article comprises a depth of compression (DOC) that is greater than or equal to 0.11t, where t is the thickness of the glass-based article, such as greater than or equal to 0.12t, greater than or equal to 0.13t, greater than or equal to 0.14t, greater than or equal to 0.15t, greater than or equal to 0.16t, greater than or equal to 0.17t, greater than or equal to 0.18t, greater than or equal to 0.19t, greater than or equal to 0.20t, greater than or equal to 0.21t, greater than or equal to 0.22t, greater than or equal to 0.23t, or more. In embodiments, the DOC is less than or equal to 0.30t, where t is the thickness of the glass-based article, such as less than or equal to 0.29t, less than or equal to 0.28t, less than or equal to 0.27t, less than or equal to 0.26t, less than or equal to 0.25t, less than or equal to 0.24t, or less. The DOC may fall within a range formed between any of the aforementioned values.

In one or more embodiments, the glass-based article comprises a spike depth of layer ($DOL_{sp}$) that is in the range of greater than or equal to 4.5 µm to less than or equal to 12.0 µm, such as greater than or equal to 5.0 µm to less than or equal to 11.5 µm, greater than or equal to 5.5 µm to less than or equal to 11.0 µm, greater than or equal to 6.0 µm to less than or equal to 10.5 µm, greater than or equal to 6.5 µm to less than or equal to 10.0 µm, greater than or equal to 7.0 µm to less than or equal to 9.5 µm, greater than or equal to 7.5 µm to less than or equal to 9.0 µm, greater than or equal to 8.0 µm to less than or equal to 8.5 µm, greater than or equal to 6.0 µm to less than or equal to 11.5 µm, and all ranges and sub-ranges formed between the foregoing endpoints. The $DOL_{sp}$ may fall within a range formed between any of the aforementioned values. In embodiments, the $DOL_{sp}/t$, where t is the thickness of the glass-based article, is from greater than or equal to 0.007 to less than or equal to 0.030, such as greater than or equal to 0.010 to less than or equal to 0.030, greater than or equal to 0.010 to less than or equal to 0.029, greater than or equal to 0.015 to less than or equal to 0.025, greater than or equal to 0.020 to less than or equal to 0.030, and all ranges and sub-ranges formed between any of the foregoing endpoints.

The stress profiles of the glass-based articles described herein may be characterized by a stress-depth integral in a tensile stress zone (A), and more specifically by the ratio A/(PT*t). In embodiments, the ratio A/(PT*t) is greater than or equal to 0.4, such as greater than or equal to 0.45, greater than or equal to 0.5, greater than or equal to 0.55, greater than or equal to 0.6, greater than or equal to 0.65, greater than or equal to 0.7, or more. In embodiments, the ratio A/(PT*t) is less than or equal to 0.75, such as less than or equal to 0.71, less than or equal to 0.7, less than or equal to 0.65, less than or equal to 0.6, less than or equal to 0.55, less than or equal to 0.5, less than or equal to 0.45, or less. In embodiments, the ratio A/(PT*t) is in the range from greater than or equal to 0.4 to less than or equal to 0.71, such as greater than or equal to 0.45 to less than or equal to 0.70, greater than or equal to 0.5 to less than or equal to 0.65, greater than or equal to 0.55 to less than or equal to 0.6, and all ranges and sub-ranges formed from any of the foregoing endpoints. If the ratio (A/PT*t) is too low, the depth of compression may be undesirably shallow. The ratio A/(PT*t) can be determined by measuring a full phase excursion of the retardation curve produced by the stress profile in a scattered-light polariscope (such as the commercial instruments SLP-1000 and SLP-2000 produced by Orihara). The peak tension is equivalent to the maximum slope occurring between the retardation minimum and maximum of the smoothed retardation curve. Said minimum and maximum occur at the two locations where stress changes sign from compressive to tensile (e.g., at the two depths of compression) in the glass-based article. When the total retardation change from the minimum to the maximum is divided by the maximum slope and by the thickness, the ratio A/(PT*t) is obtained. The slope is measured relative to the thickness dimension, e.g., the slope is the derivative of the retardation with respect to the spatial coordinate along the thickness dimension. The ranges of the ration A/(PT*t) described herein ensure that the stress profiles are produced in the IOX treatment regimes where the weight gain and the strengthening of the glass are roughly linearly correlated, eventually during IOX treatments the weight gain continues to increase roughly linearly while the rate of increase in the strengthening characteristics decreases.

The stress profiles of the glass-based articles described herein may be characterized by the ratio A/t. In embodiments, the ratio A/t is greater than or equal to 16 MPa, such as greater than or equal to 17 MPa, greater than or equal to 18 MPa, greater than or equal to 19 MPa, greater than or equal to 20 MPa, greater than or equal to 21 MPa, greater than or equal to 22 MPa, greater than or equal to 23 MPa, greater than or equal to 24 MPa, greater than or equal to 25 MPa, greater than or equal to 26 MPa, greater than or equal to 27 MPa, greater than or equal to 28 MPa, greater than or equal to 29 MPa, greater than or equal to 30 MPa, greater than or equal to 31 MPa, greater than or equal to 32 MPa, or more. In embodiments, the ratio A/t is less than or equal to 33 MPa, such as less than or equal to 32 MPa, less than or equal to 31 MPa, less than or equal to 30 MPa, less than or equal to 29 MPa, less than or equal to 28 MPa, less than or equal to 27 MPa, less than or equal to 26 MPa, less than or equal to 25 MPa, less than or equal to 24 MPa, less than or equal to 23 MPa, or less. In embodiments, the ratio A/t is in a range from greater than or equal to 16 MPa to less than or equal to 33 MPa, such as greater than or equal to 17 MPa to less than or equal to 32 MPa, greater than or equal to 18 MPa to less than or equal to 31 MPa, greater than or equal to 19 MPa to less than or equal to 30 MPa, greater than or equal to 20 MPa to less than or equal to 29 MPa, greater than or equal to 21 MPa to less than or equal to 28 MPa, greater than or equal to 22 MPa to less than or equal to 27 MPa, greater than or equal to 23 MPa to less than or equal to 26 MPa, greater than or equal to 24 MPa to less than or equal to 25 MPa, and all ranges and sub-ranges formed from any of the foregoing endpoints. If the ratio A/t is too high, the warp induced by the ion exchange treatment may be excessive. If the ratio A/t is too low, the fracture resistance of the glass-based article may be insufficient.

The stress profiles of the glass-based articles described herein may be characterized by the ratio $A/t^{3/2}$. In embodiments, the ratio $A/t^{3/2}$ is greater than or equal to 24 MPa/$mm^{1/2}$, such as greater than or equal to 26 MPa/$mm^{1/2}$, greater than or equal to 27 MPa/$mm^{1/2}$, greater than or equal to 28 MPa/$mm^{1/2}$, greater than or equal to 29 MPa/$mm^{1/2}$, greater than or equal to 30 MPa/$mm^{1/2}$, greater than or equal to 31 MPa/$mm^{1/2}$, greater than or equal to 32 MPa/$mm^{1/2}$ greater than or equal to 33 MPa/$mm^{1/2}$, greater than or equal to 34 MPa/$mm^{1/2}$ greater than or equal to 35 MPa/$mm^{1/2}$, greater than or equal to 36 MPa/$mm^{1/2}$ greater than or equal to 37 MPa/$mm^{1/2}$, greater than or equal to 38 MPa/$mm^{1/2}$ greater than or equal to 39 MPa/$mm^{1/2}$, greater than or equal to 40 MPa/$mm^{1/2}$ greater than or equal to 41 MPa/$mm^{1/2}$, greater than or equal to 42 MPa/$mm^{1/2}$ or more. In embodiments, the ratio $A/t^{3/2}$ is less than or equal to 43 MPa/$mm^{1/2}$ such as less than or equal to 42 MPa/$mm^{1/2}$, less than or equal to 41 MPa/$mm^{1/2}$ less than or equal to 40 MPa/$mm^{1/2}$, less than or equal to 29 MPa/$mm^{1/2}$, less than or equal to 38 MPa/$mm^{1/2}$, less than or equal to 37 MPa/$mm^{1/2}$, less than or equal to 36 MPa/$mm^{1/2}$ less than or equal to 35 MPa/$mm^{1/2}$, less than or equal to 34 MPa/$mm^{1/2}$, less than or equal to 33 MPa/$mm^{1/2}$, less than or equal to 32 MPa/$mm^{1/2}$, less than or equal to 31 MPa/$mm^{1/2}$ less than or equal to 30 MPa/$mm^{1/2}$, less than or equal to 29 MPa/$mm^{1/2}$, less than or equal to 28 MPa/$mm^{1/2}$, less than or equal to 27 MPa/$mm^{1/2}$, less than or equal to 26 MPa/$mm^{1/2}$ less than or equal to 25 MPa/$mm^{1/2}$, or less. In embodiments, the ratio $A/t^{3/2}$ is greater than or equal to 24 MPa/$mm^{1/2}$ to less than or equal to 43 MPa/mm$^{1/2}$, such as greater than or equal to 25 MPa/mm$^{1/2}$ to less than or equal to 42 MPa/mm$^{1/2}$, greater than or equal to 26 MPa/mm$^{1/2}$ to less than or equal to 41 MPa/mm$^{1/2}$, greater than or equal to 27 MPa/mm$^{1/2}$ to less than or equal to 40 MPa/mm$^{1/2}$, greater than or equal to 28 MPa/mm$^{1/2}$ to less than or equal to 39 MPa/mm$^{1/2}$, greater than or equal to 29 MPa/mm$^{1/2}$ to less than or equal to 38 MPa/mm$^{1/2}$, greater than or equal to 30 MPa/mm$^{1/2}$ to less than or equal to 37 MPa/mm$^{1/2}$, greater than or equal to 31 MPa/mm$^{1/2}$ to less than or equal to 36 MPa/mm$^{1/2}$, greater than or equal to 32 MPa/mm$^{1/2}$ to less than or equal to 35 MPa/mm$^{1/2}$, greater than or equal to 33 MPa/mm$^{1/2}$ to less than or equal to 34 MPa/mm$^{1/2}$, and all ranges and sub-ranges formed between the foregoing endpoints.

The stress profiles of the glass-based articles described herein may be characterized by the ratio A/(E*t), where E is the Young's modulus of the glass-based substrate utilized to form the glass-based article. In embodiments, the ratio A/(E*t) is greater than or equal to $3.5 \times 10^{-4}$, such as greater than or equal to $4 \times 10^{-4}$, greater than or equal to $4.5 \times 10^{-4}$, greater than or equal to $5 \times 10^{-4}$, greater than or equal to $5.5 \times 10^{-4}$, greater than or equal to $6 \times 10^{-4}$, greater than or equal to $6.5 \times 10^{-4}$, greater than or equal to $7 \times 10^{-4}$, greater than or equal to $7.5 \times 10^{-4}$, greater than or equal to $8 \times 10^{-4}$, greater than or equal to $8.5 \times 10^{-4}$, or more. In embodiments, the ratio A/(E*t) is less than or equal to $9 \times 10^{-4}$, such as less than or equal to $8.5 \times 10^{-4}$, less than or equal to $8 \times 10^{-4}$, less than or equal to $7.5 \times 10^{-4}$, less than or equal to $7 \times 10^{-4}$, less than or equal to $6.5 \times 10^{-4}$, less than or equal to $6 \times 10^{-4}$, less than or equal to $5.5 \times 10^{-4}$, less than or equal to $5 \times 10^{-4}$, less than or equal to $4.5 \times 10^{-4}$, less than or equal to $4 \times 10^{-4}$, or less. In embodiments, the ratio A/(E*t) is in the range from greater than or equal to $3.5 \times 10^{-4}$ to less than or equal to $9 \times 10^{-4}$, such as greater than or equal to $4 \times 10^{-4}$ to less than or equal to $8.5 \times 10^{-4}$, greater than or equal to $4.5 \times 10^{-4}$ to less than or equal to $8 \times 10^{-4}$, greater than or equal to $5 \times 10^{-4}$ to less than or equal to $7.5 \times 10^{-4}$, greater than or equal to $5.5 \times 10^{-4}$ to less than or equal to $7 \times 10^{-4}$, greater than or equal to $6 \times 10^{-4}$ to less than or equal to $6.5 \times 10^{-4}$, and all ranges and sub-ranges formed between any of the foregoing endpoints.

The stress profiles of the glass-based articles described herein may be characterized by the ratio PT/(E*t), where E is the Young's modulus of the glass-based substrate utilized to form the glass-based article. In embodiments, the ratio PT/(E*t) is greater than or equal to 0.8 m$^{-1}$, such as greater than or equal to 0.9 m$^{-1}$, greater than or equal to 1.0 m$^{-1}$, greater than or equal to 1.1 m$^{-1}$, greater than or equal to 1.2 m$^{-1}$, greater than or equal to 1.3 m$^{-1}$, greater than or equal to 1.4 m$^{-1}$, greater than or equal to 1.5 m$^{-1}$, greater than or equal to 1.6 m$^{-1}$, greater than or equal to 1.7 m$^{-1}$, greater than or equal to 1.8 m$^{-1}$, greater than or equal to 1.9 m$^{-1}$, greater than or equal to 2.0 m$^{-1}$, greater than or equal to 2.1 m$^{-1}$, or more. In embodiments, the ratio PT/(E*t) is less than or equal to 2.2 m$^{-1}$, such as less than or equal to 2.1 m$^{-1}$, less than or equal to 2.0 m$^{-1}$, less than or equal to 1.9 m$^{-1}$, less than or equal to 1.8 m$^{-1}$, less than or equal to 1.7 m$^{-1}$, less than or equal to 1.6 m$^{-1}$, less than or equal to 1.5 m$^{-1}$, less than or equal to 1.4 m$^{-1}$, less than or equal to 1.3 m$^{-1}$, less than or equal to 1.2 m$^{-1}$, less than or equal to 1.1 m$^{-1}$, less than or equal to 1.0 m$^{-1}$, less than or equal to 0.9 m$^{-1}$, or less. In embodiments, the ratio PT/(E*t) is in a range from greater than or equal to 0.8 m$^{-1}$ to less than or equal to 2.2 m$^{-1}$, such as greater than or equal to 0.9 m$^{-1}$ to less than or equal to 2.1 m$^{-1}$, greater than or equal to 1.0 m$^{-1}$ to less than or equal to 2.0 m$^{-1}$, greater than or equal to 1.1 m$^{-1}$ to less than or equal to 1.9 m$^{-1}$, greater than or equal to 1.2 m$^{-1}$ to less than or equal to 1.8 m$^{-1}$, greater than or equal to 1.3 m$^{-1}$ to less than or equal to 1.7 m$^{-1}$, greater than or equal to 1.4 m$^{-1}$ to less than or equal to 1.6 m$^{-1}$, greater than or equal to 1.5 m$^{-1}$, and all ranges and sub-ranges formed between the foregoing endpoints. If the ratio PT/(E*t) is too low, the fracture resistance of the glass-based article may be insufficient.

The glass-based articles may have any appropriate thickness. In one or more embodiments, the glass-based article has a thickness (t) of greater than or equal to 0.2 mm to less than or equal to 2.0 mm, such as greater than or equal to 0.3 mm to less than or equal to 1.0 mm, greater than or equal to 0.3 mm to less than or equal to 0.8 mm, greater than or equal to 0.4 mm to less than or equal to 0.9 mm, greater than or equal to 0.4 mm to less than or equal to 0.6 mm, greater than or equal to 0.5 mm to less than or equal to 0.8 mm, greater than or equal to 0.6 mm to less than or equal to 0.7 mm. The thickness (t) may fall within a range formed between any of the aforementioned values. The thickness of the glass-based articles may be determined by the thickness of the glass-based substrates utilized to produce the glass-based articles. In embodiments, the glass-based article may have a thickness that is less than the thickness of the glass-based substrate utilized to form the glass-based article due to post-IOX processing, such as surface polishing or etching.

The glass-based articles described herein may exhibit a high CS and a reduced PT, which may beneficially limit edge failures.

The glass-based articles may be characterized by any or all of the attributes and features described herein. For example, a stress profile of the type described herein may be characterized by any combination of the attributes described herein.

Glass-Based Substrates

Examples of materials that may be used as glass-based substrates may include alkali-aluminosilicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-aluminoborosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size. In embodiments, glass-based substrates may include a lithium-containing aluminosilicate. In embodiments, glass-based substrates may include an alkali-containing glass ceramic.

In embodiments, the glass-based substrates may be formed from any composition capable of forming the stress profiles described herein. In embodiments, the glass-based substrates may be formed from the glass compositions described in U.S. Patent App. Pub. No. 2019/0161390A1 titled "Glasses With Low Excess Modifier Content," published May 30, 2019, the entirety of which is incorporated herein by reference. In embodiments, the glass-based substrates may be formed from the glass compositions described in U.S. Patent App. Pub. No. 2019/0161386A1 titled "Ion-Exchangeable Mixed Alkali Aluminosilicate Glasses," published May 30, 2019, the entirety of which is incorporated herein by reference.

The glass-based substrates may include $Li_2O$. The inclusion of $Li_2O$ in the glass-based substrate may increase the fracture toughness of the glass-based substrate and may decrease the time required to produce the desired stress profiles through ion exchange. In embodiments, the $Li_2O$ molar concentration of the glass-based substrates is less than or equal to 12 mol %.

In embodiments, the molar ratio of $Li_2O$ to $Na_2O$ in the glass-based substrates is less than or equal to 2.0, such as less than or equal to 1.8, less than or equal to 1.7, less than or equal to 1.6, less than or equal to 1.5, less than or equal to 1.4, less than or equal to 1.3, less than or equal to 1.2, less than or equal to 1.1, less than or equal to 1.0, or less.

The glass-based substrate may be characterized by the manner in which it may be formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In some embodiments, the glass-based substrates described herein may be formed using a roll-forming process. For example, a roll-forming process may be utilized to produce glass-based substrates with relatively uniform thicknesses.

In one or more embodiments, the glass-based substrates described herein may exhibit an amorphous microstructure and may be substantially free of crystals or crystallites. In other words, the glass-base substrates articles exclude glass-ceramic materials in some embodiments.

The glass-based substrate may have a 2 dimensional (2D), a 2.5 dimensional (2.5D), or a 3 dimensional (3D) shape. As utilized herein, a 2D shape refers to a glass-based substrate where both major surfaces are flat (planar). As utilized herein, a 2.5D shape refers to a glass-based substrate where one major surface is flat (planar) and one major surface is curved. A common 2.5D shape for glass-based articles includes beveled or chamfered edges. As utilized herein, a 3D shape refers to a glass-based substrate where both major surfaces are curved.

Ion Exchange (IOX) Treatment

Chemical strengthening of glass-based substrates having base compositions is done by contacting the glass-based substrates with an ion exchange source. The contacting may be carried out by placing the ion-exchangeable glass-based substrates in a molten bath containing cations (e.g., $K^+$, $Na^+$, $Ag^+$, etc.) that diffuse into the glass while the smaller alkali ions (e.g., $Na^+$, $Li^+$) of the glass diffuse out into the molten bath. The replacement of the smaller cations by larger ones creates compressive stresses near the top surface of the glass-based articles. Tensile stresses are generated in the interior of the glass-based articles that balance the near-surface compressive stresses.

The IOX processes utilized to form the glass-based articles described herein include only a single ion exchange treatment. Such processes are referred to as single ion exchange (SIOX) treatments. The use of SIOX treatments may reduced cost and complexity when compared to multi-step ion exchange treatments, such as IOX processes that include treatments in multiple molten baths.

The baths utilized for the ion exchange treatment of the glass-based substrates to form the glass-based articles disclosed herein may include a mixture of salts. In embodiments, the IOX baths include potassium and sodium. For example, the ion exchange bath may include a mixture of sodium nitrate and potassium nitrate, without the inclusion of lithium nitrate. In other embodiments, the ion exchange bath may include a mixture of sodium nitrate, potassium nitrate, and lithium nitrate. The baths may also include silicic acid, such as in an amount of about 0.5 wt % of the total amount of the nitrates. In embodiments, the IOX bath may include carbonate, such as potassium carbonate.

In embodiments, the IOX bath includes less than or equal to 10 wt % $NaNO_3$, such as less than or equal to 9.5 wt %, less than or equal to 9 wt %, less than or equal to 8.5 wt %, less than or equal to 8 wt %, less than or equal to 7.5 wt %, less than or equal to 7 wt %, less than or equal to 6.5 wt %, less than or equal to 6 wt %, less than or equal to 5.5 wt %, less than or equal to 5 wt %, less than or equal to 4.5 wt %, less than or equal to 4 wt %, less than or equal to 3.5 wt %, less than or equal to 3 wt %, less than or equal to 2.5 wt %, less than or equal to 2 wt %, less than or equal to 1.5 wt %, or less. In embodiments, the IOX bath includes greater than or equal to 1 wt % $NaNO_3$, such as greater than or equal to 1.5 wt %, greater than or equal to 2 wt %, greater than or equal to 1.5 wt %, greater than or equal to 2 wt %, greater than or equal to 2.5 wt %, greater than or equal to 3 wt %, greater than or equal to 3.5 wt %, greater than or equal to 4 wt %, greater than or equal to 4.5 wt %, greater than or equal to 5 wt %, greater than or equal to 5.5 wt %, greater than or equal to 6 wt %, greater than or equal to 6.5 wt %, greater than or equal to 7 wt %, greater than or equal to 7.5 wt %, greater than or equal to 8 wt %, greater than or equal to 8.5 wt %, greater than or equal to 9 wt %, greater than or equal to 9.5 wt %, or more. In embodiments, the IOX bath includes $NaNO_3$ in the range from greater than or equal to 1 wt % to less than or equal to 10 wt %, such as greater than or equal to 1.5 wt % to less than or equal to 9.5 wt %, greater than or equal to 2 wt % to less than or equal to 9 wt %, greater than or equal to 2.5 wt % to less than or equal to 8.5 wt %, greater than or equal to 3 wt % to less than or equal to 8 wt %, greater than or equal to 3.5 wt % to less than or equal to 7.5 wt %, greater than or equal to 4 wt % to less than or equal to 7 wt %, greater than or equal to 4.5 wt % to less than or equal to 6.5 wt %, greater than or equal to 5.5 wt % to less than or equal to 6 wt %, greater than or equal to 4 wt % to less than or equal to 6 wt %, and all ranges and sub-ranges formed between the foregoing endpoints. The balance of the IOX bath may be potassium, such as in the form of $KNO_3$.

The IOX treatment, as defined by the time in which the glass-based substrate is in contact with the IOX medium, may extend for any appropriate time period. In embodiments, the IOX treatment extends for a time period in the range of greater than or equal to 15 minutes to less than or equal to 200 minutes, such as greater than or equal to 20 minutes to less than or equal to 190 minutes, greater than or equal to 30 minutes to less than or equal to 180 minutes, greater than or equal to 40 minutes to less than or equal to 170 minutes, greater than or equal to 50 minutes to less than or equal to 160 minutes, greater than or equal to 60 minutes to less than or equal to 150 minutes, greater than or equal to 70 minutes to less than or equal to 140 minutes, greater than or equal to 80 minutes to less than or equal to 130 minutes, greater than or equal to 90 minutes to less than or equal to 120 minutes, greater than or equal to 100 minutes to less than or equal to 110 minutes, greater than or equal to 65 minutes to less than or equal to 180 minutes, and all ranges and sub-ranges formed between the foregoing endpoints.

The IOX bath may be at any appropriate temperature during the IOX treatment. In embodiments, the IOX bath is at a temperature in a range from greater than or equal to 370° C. to less than or equal to 450° C., such as greater than or equal to 380° C. to less than or equal to 440° C., greater than or equal to 390° C. to less than or equal to 430° C., greater than or equal to 400° C. to less than or equal to 420° C., greater than or equal to 410° C. to less than or equal to 450° C., greater than or equal to 380° C. to less than or equal to 420° C., greater than or equal to 380° C. to less than or equal to 390° C., and all ranges and sub-ranges formed between the foregoing values.

The IOX treatments described herein may be characterized by the weight gain produced in the glass-based articles. The weight gain is calculated as a percentage by comparison to the weight of the glass-based substrate prior to the IOX treatment. In embodiments, the IOX treatment produces a weight gain of less than or equal to 1%, such as less than or equal to 0.9%, less than or equal to 0.8%, less than or equal to 0.7%, less than or equal to 0.6%, less than or equal to 0.5%, less than or equal to 0.4%, less than or equal to 0.3%, less than or equal to 0.2%, less than or equal to 0.1%, or less.

After an ion exchange process is performed, it should be understood that a composition at the surface of a glass-based article is different than the composition of the as-formed glass-based substrate. This results from one type of alkali metal ion in the as-formed glass, such as, for example $Li^+$ or $Na^+$, being replaced with larger alkali metal ions, such as, for example $Na^+$ or $K^+$, respectively. However, the composition at or near the center of the depth of the glass-based article will, in embodiments, still be the same as the composition of the as-formed glass-based substrate.

End Products

Figure 3A:
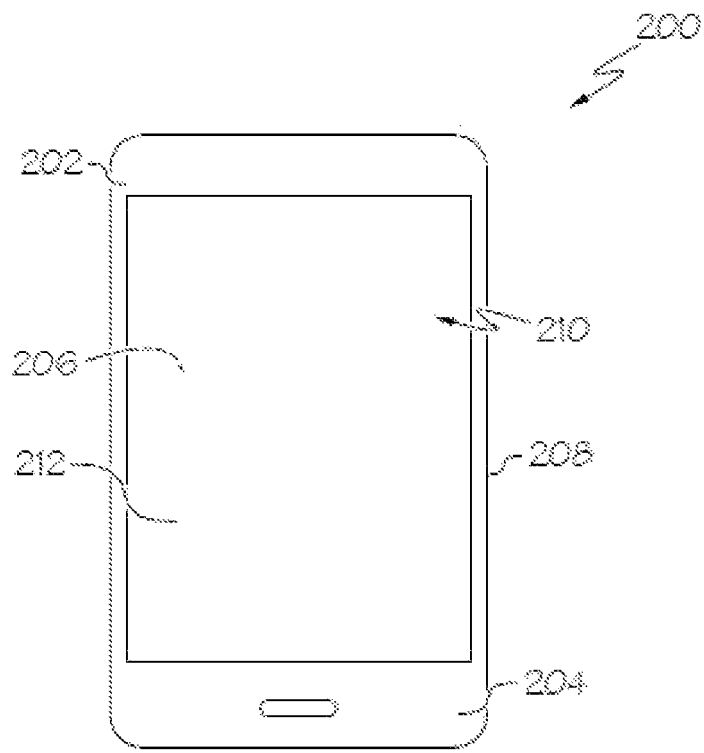
FIG. 3A is a plan view of an exemplary electronic device incorporating any of the glass articles disclosed herein.
Figure 3B:
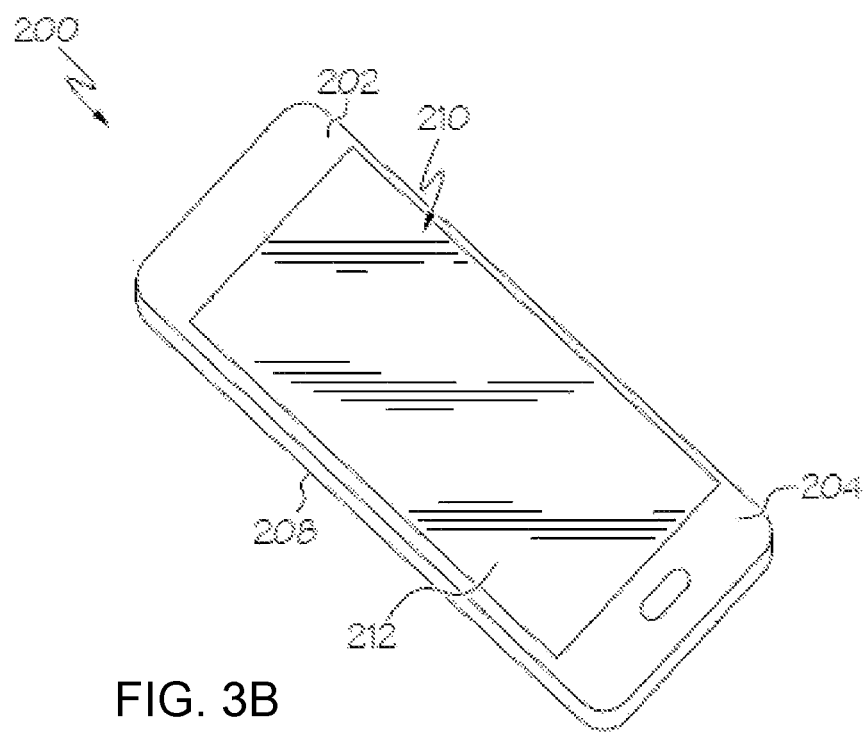
FIG. 3B is a perspective view of the exemplary electronic device of FIG. 3A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 3A and 3B. Specifically, FIGS. 3A and 3B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover 212 at or over the front surface of the housing such that it is over the display. In embodiments, at least a portion of at least one of the cover 212 and the housing 202 includes any of the glass-based articles described herein.

EXAMPLES

Embodiments will be further clarified by the following examples. It should be understood that these examples are not limiting to the embodiments described above.

Glass-substrates were formed having an exemplary composition of 63.70 mol % $SiO_2$, 16.18 mol % $Al_2O_3$, 0.39 mol % $B_2O_3$, 8.10 mol % $Na_2O$, 0.53 mol % $K_2O$, 8.04 mol % $Li_2O$, 0.33 mol % MgO, 0.01 mol % $TiO_2$, 0.02 mol % $Fe_2O_3$, 2.64 mol % $P_2O_5$, and 0.05 mol % $SnO_2$.

The glass-based substrates were ion exchanged. The ion exchange conditions and measured properties are reported in Table I below. The ion exchange bath included the reported amount of sodium, as sodium nitrate, 0.5 wt % silicic acid, and the remainder was potassium nitrate. The ion exchange bath sodium contents identified with "*" in Table I additionally included 5 wt % $K_2CO_3$. The weight gain reported in Table I was calculated by comparing the weight of the ion exchanged glass-based article to the weight of the glass-based substrate utilized to form the glass-based article prior to ion exchange treatment. In some instances the glass-based article broke during the ion exchange treatment and the weight gain could not be calculated.

TABLE I

| Thickness (mm) | Temp. (° C.) | Time (mins) | Na (wt %) | CS (MPa) | DOLsp (μm) | DOLsp/t | $CS_K$ (MPa) | Weight Gain (%) | PT (MPa) |
|---|---|---|---|---|---|---|---|---|---|
| 0.25 | 380 | 34 | 9 | 794 | 5.50 | 0.0220 | 63 | 0.7423 | 56.08 |
| 0.25 | 380 | 34 | 6 | 837 | 5.90 | 0.0236 | 57 | 0.6656 | 50.38 |
| 0.25 | 380 | 41 | 9 | 791 | 6.00 | 0.0240 | 70 | 0.7894 | 54.65 |
| 0.25 | 380 | 20 | 1 | 1113 | 4.90 | 0.0196 | 17.00 | 0.2742 | 21.83 |
| 0.25 | 380 | 41 | 9 | 692 | 6.20 | 0.0248 | 66 | 0.7629 | |
| 0.25 | 380 | 34 | 6 | 839 | 5.80 | 0.0232 | 51 | 0.6263 | |

TABLE I-continued

| Thickness (mm) | Temp. (° C.) | Time (mins) | Na (wt %) | CS (MPa) | DOLsp (μm) | DOLsp/t | $CS_K$ (MPa) | Weight Gain (%) | PT (MPa) |
|---|---|---|---|---|---|---|---|---|---|
| 0.33 | 380 | 40 | 9 | 804 | 6.00 | 0.0182 | 102 | 0.6713 | 42.92 |
| 0.33 | 380 | 45 | 9 | 791 | 6.60 | 0.0200 | 90 | 0.7182 | 46.13 |
| 0.33 | 380 | 45 | 6 | 827 | 6.70 | 0.0203 | 64 | 0.5852 | 44.91 |
| 0.33 | 380 | 40 | 6 | 840 | 6.20 | 0.0188 | 57 | 0.5693 | 42.11 |
| 0.33 | 380 | 40 | 9 | 864 | 6.20 | 0.0188 | 73 | 0.5891 | 40.36 |
| 0.4 | 380 | 65 | 4 | 910 | 8.68 | 0.0217 | 34.95 | 0.5100 | 53.11 |
| 0.4 | 380 | 94 | 4 | 865 | 11.33 | 0.0283 | 85 | 0.1182 | 43.23 |
| 0.4 | 380 | 90 | 4 | 861 | 10.24 | 0.0256 | 34 | 0.6104 | 48.59 |
| 0.5 | 380 | 90 | 9 | 910 | 7.80 | 0.0156 | 79 | 0.5584 | 66.30 |
| 0.5 | 380 | 120 | 9 | 900 | 9.30 | 0.0186 | 86 | 0.6502 | 69.10 |
| 0.5 | 380 | 150 | 9 | 894 | 9.90 | 0.0198 | 106 | 0.7241 | 67.70 |
| 0.5 | 390 | 90 | 6* | 950 | 9.30 | 0.0186 | 69 | 0.5403 | |
| 0.5 | 390 | 120 | 6* | 944 | 11.10 | 0.0222 | 53 | 0.5919 | 65.74 |
| 0.5 | 380 | 90 | 6* | 958 | 8.20 | 0.0164 | 73 | 0.4650 | |
| 0.5 | 390 | 90 | 2* | 1096 | 10.50 | 0.0210 | 33 | 0.3791 | |
| 0.5 | 390 | 120 | 2* | 1079 | 11.70 | 0.0234 | 23 | 0.4175 | 46.09 |
| 0.5 | 380 | 66 | 2* | 1116 | 7.70 | 0.0154 | 51 | broke | |
| 0.5 | 380 | 75 | 3* | 1060 | 7.70 | 0.0154 | 59 | broke | 44.70 |
| 0.6 | 380 | 180 | 9 | 867 | 9.86 | 0.0164 | 118 | 0.5464 | 76.50 |
| 0.6 | 380 | 65 | 4 | 1011 | 6.58 | 0.0110 | 107 | 0.2734 | 48.40 |
| 0.6 | 380 | 75 | 4 | 1015 | 6.90 | 0.0115 | 101 | 0.0201 | 51.86 |
| 0.75 | 380 | 65 | 7 | 973 | 7.20 | 0.0096 | 102 | 0.2011 | 38.86 |
| 0.75 | 380 | 82 | 7 | 991 | 8.25 | 0.0110 | 94 | 0.2338 | 43.48 |
| 0.75 | 380 | 52 | 7 | 988 | 6.60 | 0.0088 | 68 | 0.1893 | 36.89 |
| 0.75 | 380 | 60 | 6 | 909 | 7.20 | 0.0096 | 138 | 0.2154 | 44.44 |
| 1.1 | 390 | 60 | 7 | 892 | 7.92 | 0.0072 | 124 | 0.2379 | 34.97 |
| 1.1 | 390 | 75 | 7 | 882 | 8.97 | 0.0082 | 121 | 0.2664 | 38.50 |
| 1.1 | 390 | 90 | 7 | 880 | 10.02 | 0.0091 | 116 | 0.2887 | 42.15 |
| 1.1 | 390 | 105 | 7 | 874 | 9.89 | 0.0090 | 116 | 0.2858 | 41.89 |
| 1.1 | 390 | 120 | 7 | 876 | 10.41 | 0.0095 | 120 | 0.3095 | 45.36 |
| 1.1 | 390 | 145 | 7 | 880 | 11.22 | 0.0102 | 114 | 0.3328 | 47.60 |
| 1.1 | 380 | 108 | 9 | 848 | 8.70 | 0.0079 | 133 | 0.2967 | 41.70 |
| 1.1 | 380 | 165 | 9 | 840 | 10.46 | 0.0095 | 141 | 0.3571 | 51.00 |

Comparative glass-based substrates were prepared with a composition of 67.37 mol % $SiO_2$, 12.73 mol % $Al_2O_3$, 3.67 mol % $B_2O_3$, 13.77 mol % $Na_2O$, 0.01 mol % $K_2O$, 2.39 mol % MgO, 0.01 mol % $ZrO_2$, 0.01 mol % $Fe_2O_3$, and 0.09 mol % $SnO_2$.

Figure 4:
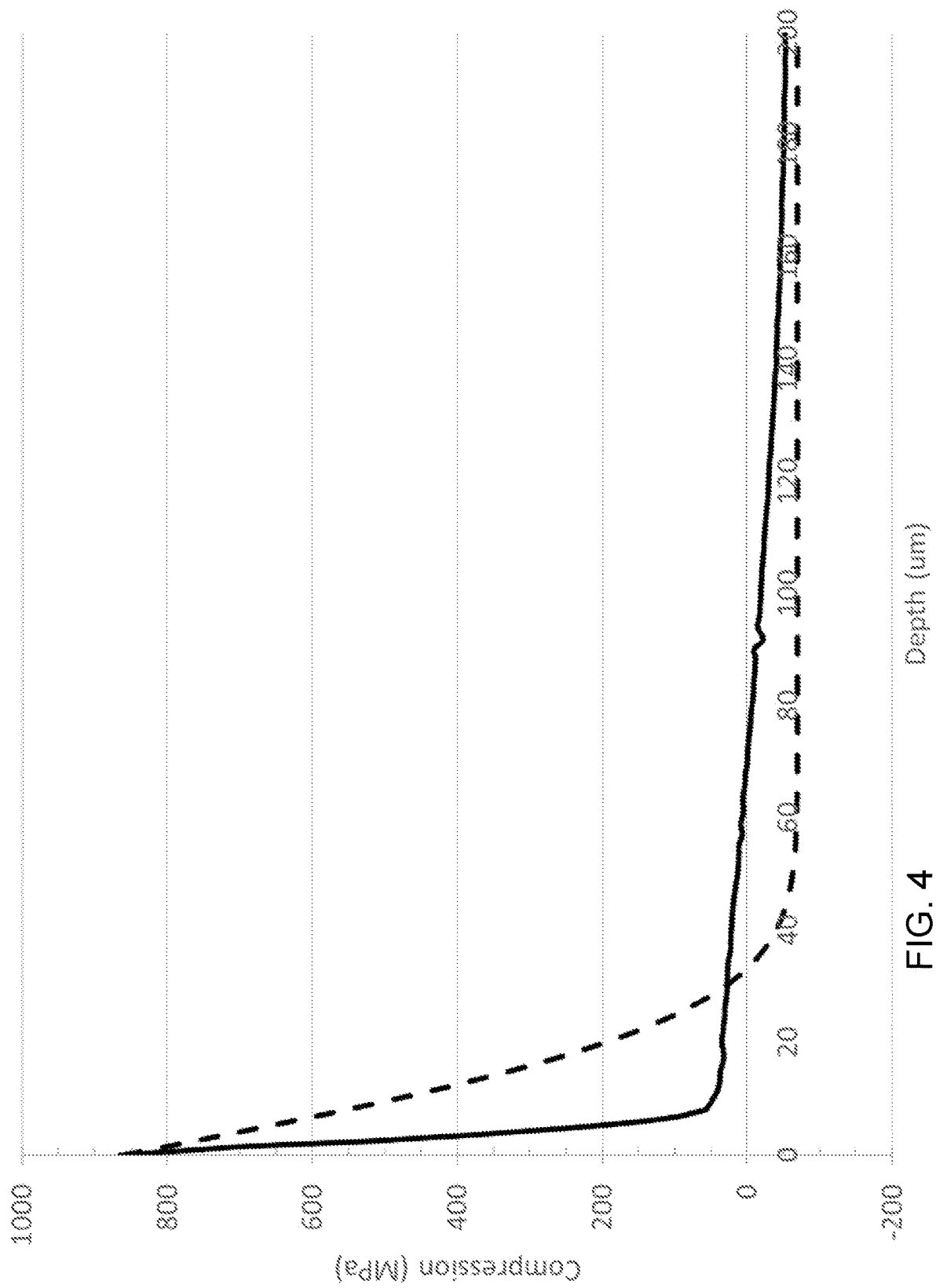
FIG. 4 is a stress profile of a glass-based article of an embodiment and a comparative glass-based article.

A glass-based substrate with the exemplary composition described above and a comparative glass-based substrate, each with a thickness of 0.4 mm, were ion exchanged. The glass-based substrate was ion exchanged in bath of 4 wt % $NaNO_3$ and 96 wt % $KNO_3$ at a temperature of 380° C. for 65 minutes. The comparative glass-based substrate was ion exchanged in bath of 100 wt % $KNO_3$ at a temperature of 420° C. for 4 hours. The stress profiles of the resulting glass-based articles were measured and are shown in FIG. 4, with the comparative glass-based article shown with a dashed line.

Figure 5:
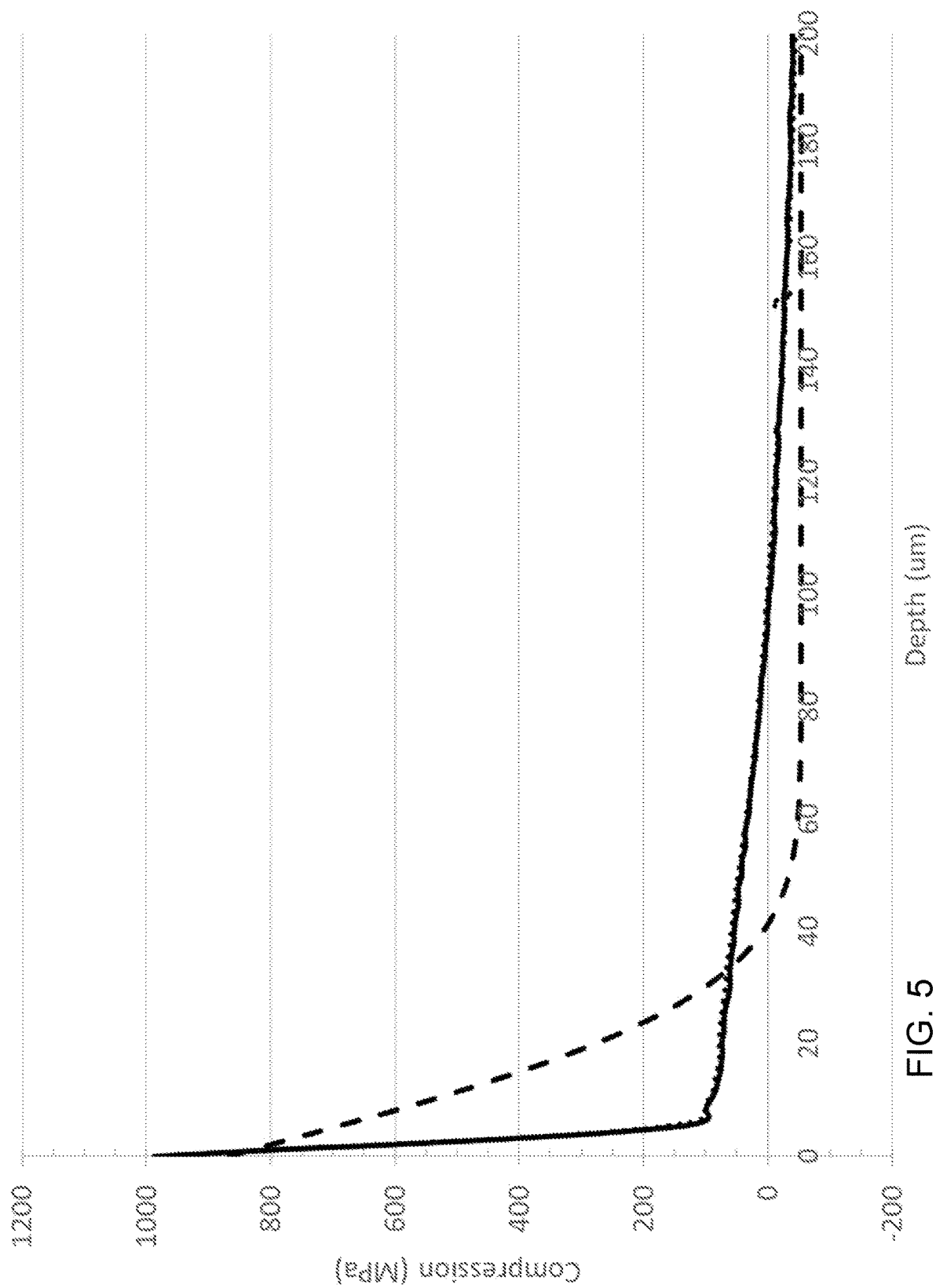
FIG. 5 is a stress profile of a glass-based article according to an embodiment and a comparative glass-based article.

A first glass-based substrate, a second glass-based substrate, and a comparative glass-based substrate, each with a thickness of 0.6 mm, were ion exchanged. The first and second glass-based substrate had the exemplary composition described above. The first glass-based substrate was ion exchanged in bath of 4 wt % $NaNO_3$ and 96 wt % $KNO_3$ at a temperature of 380° C. for 65 minutes. The second glass-based substrate was ion exchanged in bath of 4 wt % $NaNO_3$ and 96 wt % $KNO_3$ at a temperature of 380° C. for 75 minutes. The comparative glass-based substrate was ion exchanged in bath of 100 wt % $KNO_3$ at a temperature of 420° C. for 5.5 hours. The stress profiles of the resulting glass-based articles were measured and are shown in FIG. 5, with the first glass-based article shown with a solid line, the second glass-based article shown with a dotted line, and the comparative glass-based article shown with a dashed line.

Examples 1, 2, and 3 below were produced from glass-based samples having the exemplary composition described above. The IOX bath included 4 wt % $NaNO_3$, about 96 wt % $KNO_3$, and 0.5 wt % silicic acid, and the bath was at a temperature of 380° C. The IOX time and thickness of the glass-based substrates for each example are reported in Table II.

TABLE II

| Example | Thickness (mm) | Time (mins) | Excursion | Slope | A/(CT*t) | CT*t/A | CT |
|---|---|---|---|---|---|---|---|
| 1 | 0.4 | 65 | 1.40 | 8.26 | 0.42 | 2.36 | 53.1 |
| 2 | 0.6 | 65 | 2.12 | 6.86 | 0.51 | 1.94 | 48.4 |
| 3 | 0.6 | 75 | 2.22 | 7.89 | 0.47 | 2.13 | 51.9 |

TABLE II-continued

| Example | CT/t (MPa/mm) | CT/t^2 (MPa/mm^2) | A/t (MPa) | A/t^2 (MPa/mm) | A/t^(3/2) | CT/(E*t) (m^−1) | A/(E*t) |
|---|---|---|---|---|---|---|---|
| 1 | 132.8 | 331.9 | 22.5 | 56.3 | 35.6 | 1.72 | 0.00073 |
| 2 | 80.7 | 134.4 | 24.9 | 41.5 | 32.2 | 1.05 | 0.00054 |
| 3 | 86.5 | 144.2 | 24.3 | 40.6 | 31.4 | 1.12 | 0.00053 |

Figure 6:
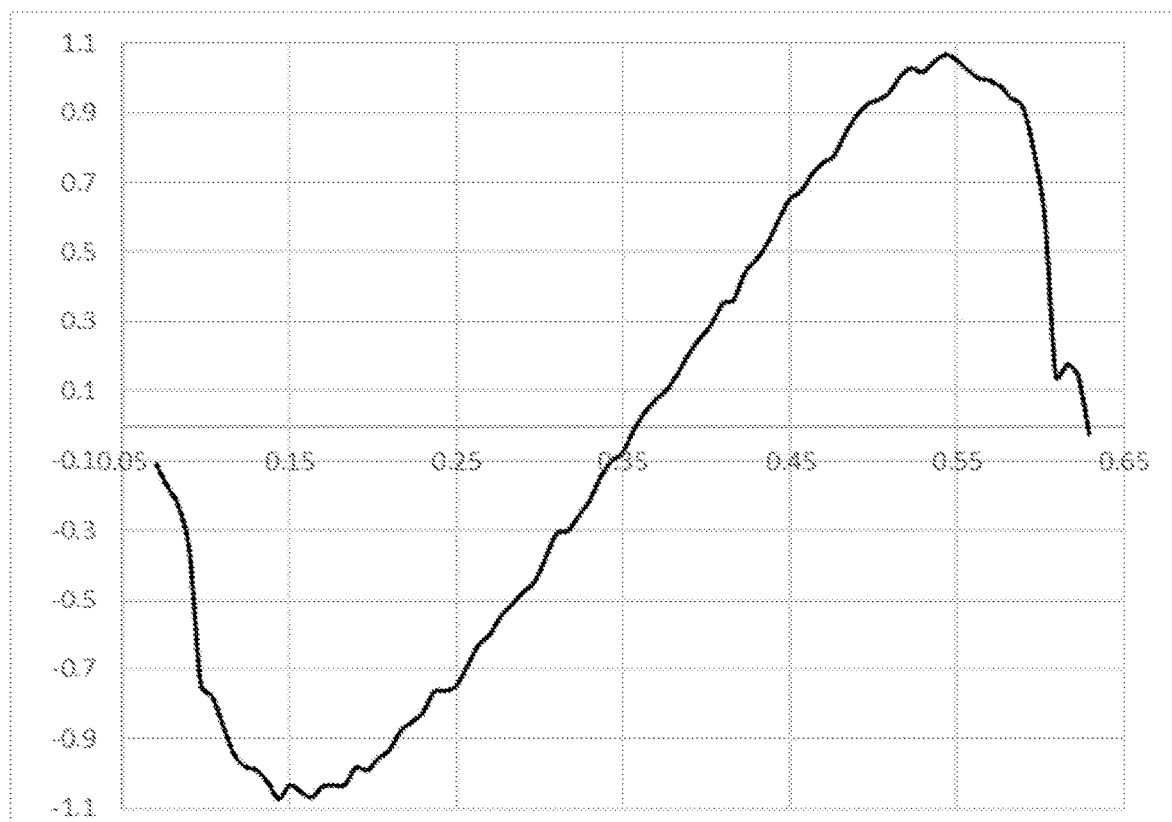
FIG. 6 is a retardation curve of a glass-based article according to an embodiment.
Figure 7:
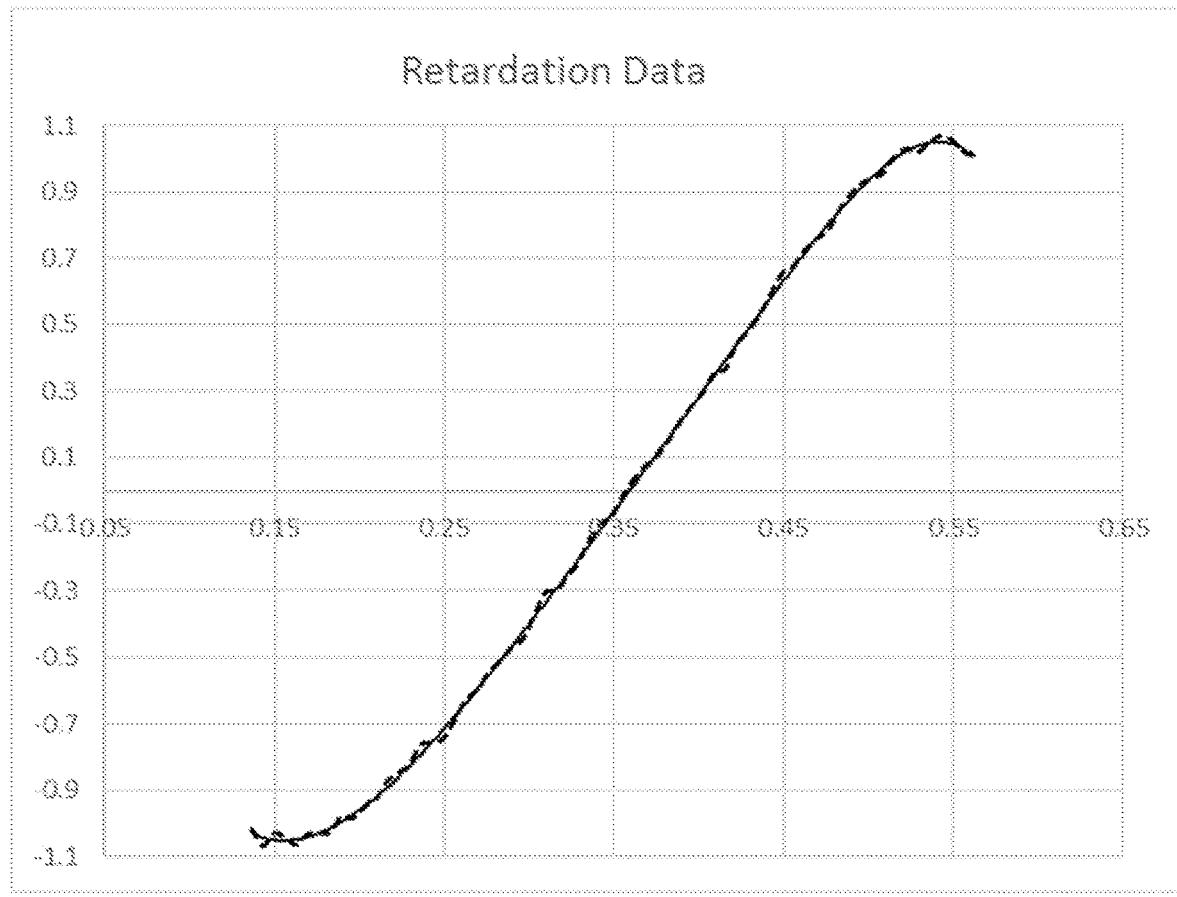
FIG. 7 is a selected portion of the retardation curve of FIG. 6.

The measured properties reported in Table II are the averages of two measurements performed at orientations that differ by 90°. The retardation curve for Example 2 is shown in FIG. 6, with the horizontal axis being position in the thickness direction of the glass-based article and the vertical axis being the retardation in radians. The surfaces of Example 2 are located at about 0.05 mm and 0.65 mm on the plot in FIG. 6. A limited portion of the retardation curve is shown in FIG. 7 and contains the minimum and maximum retardation which occur at the two DOC points in the glass-based article. The noise in the retardation is successfully eliminated in FIG. 7. A polynomial fit of order 6 was applied to this limited portion of the retardation, to obtain a smooth approximation for the retardation near the minimum and the maximum and estimate the minimum and maximum value more precisely. The retardation in this FIG. 7 is shown with a dashed line, and the fit is shown with a solid line. It should be noted that the scattered-light polarimetry usually slightly under-estimates the difference between the minimum and maximum retardation when the thickness is smaller than about 1 mm due to limited resolution (finite size of the laser beam). Hence, the estimate of the stress area, which is proportional to this difference between the minimum and maximum retardation, represents a lower-end estimate, and the actual ratio A/(PT*t) may be slightly higher, most often by no more than 5%.

Figure 8:
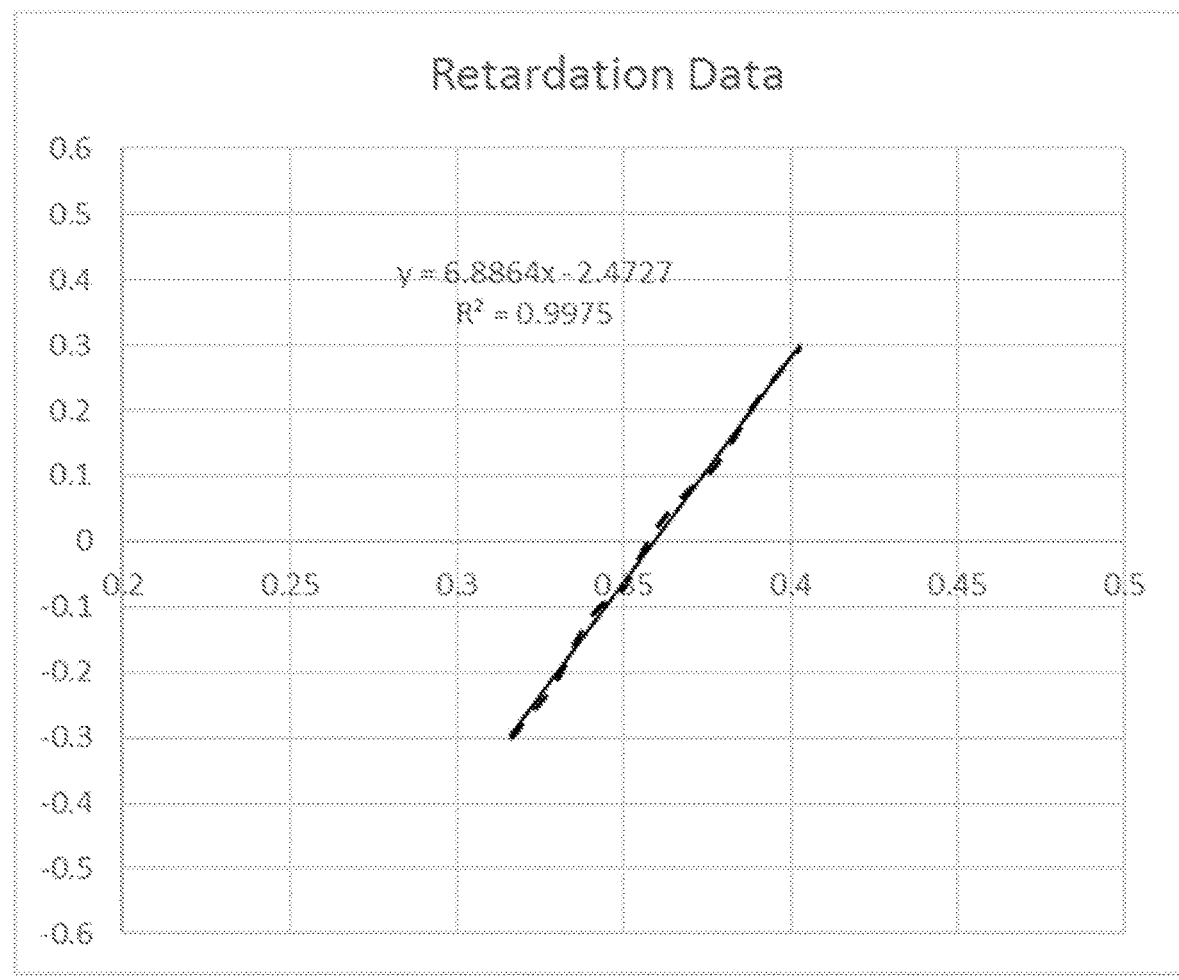
FIG. 8 is linear fit of the central portion of the retardation curve of FIG. 6.

The maximum slope may be found by differentiating the polynomial fit of FIG. 7 and finding the maximum of the derivative polynomial. Alternatively, the maximum slope may be found by a linear fit to a central region where the maximum slope is occurring when the chemical strengthening of the sheet is substantially symmetric, as shown in FIG. 8. In FIG. 8, only a central substantially linear portion of the retardation curve was retained for the purpose of the linear fit.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-based article, comprising:
    a first surface and a second surface defining a thickness t, wherein t is greater than or equal to 0.2 mm to less than or equal to 0.65 mm;
    a peak tension PT of greater than or equal to 21 MPa and less than or equal to 60 MPa;
    a compressive stress CS of greater than or equal to 650 MPa to less than or equal to 1200 MPa;
    a depth of layer of a spike $DOL_{sp}$ of greater than or equal to 4.5 μm to less than or equal to 12.0 μm;
    a compressive stress at a knee $CS_K$ of greater than or equal to 15 MPa to less than or equal to 150 MPa; and
    a stress-depth integral in a tensile stress zone A, and A/(PT*t) is greater than or equal to 0.4 and less than or equal to 0.71.

2. The glass-based article of claim 1, wherein $DOL_{SP}/t$ is greater than or equal to 0.010 to less than or equal to 0.030.

3. The glass-based article of claim 1, further comprising a depth of compression DOC, wherein the DOC is greater than or equal to 0.11t.

4. The glass-based article of claim 1, further comprising a stress-depth integral in a tensile stress zone A, and A/t is greater than or equal to 16 MPa and less than or equal to 22 MPa.

5. The glass-based article of claim 1, further comprising a stress-depth integral in a tensile stress zone A, and $A/t^{3/2}$ is greater than or equal to 24 $MPa/mm^{1/2}$ and less than or equal to 43 $MPa/mm^{1/2}$.

6. The glass-based article of claim 1, wherein PT/(E*t) is greater than or equal to 0.8 m−1 and less than or equal to 2.2 $m^{-1}$, and E is the Young's modulus of a glass-based substrate having the same composition and microstructure as the center of the glass-based article.

7. The glass-based article of claim 1, further comprising a stress-depth integral in a tensile stress zone A, and A/(E*t) is greater than or equal to $3.5 \times 10^{-4}$ and less than or equal to $9 \times 10^{-4}$, and E is the Young's modulus of a glass-based substrate having the same composition and microstructure as the center of the glass-based article.

8. The glass-based article of claim 1, wherein a ratio of the molar concentration of $Li_2O$ to the molar concentration of $Na_2O$ at the center of the glass-based article is less than or equal to 2.0.

9. The glass-based article of claim 1, wherein the $Li_2O$ concentration at the center of the glass-based article is less than or equal to 12 mol %.

10. A consumer electronic product comprising:
    a housing comprising a front surface, a back surface, and side surfaces;
    electrical components provided at least partially within the housing, the electrical components comprising at least a controller, a memory, and a display, the display being provided at or adjacent the front surface of the housing; and
    a cover disposed over the display;
    wherein at least a portion of at least one of the housing and the cover comprises the glass-based article of claim 1.

11. A method, comprising:
    exposing a glass-based substrate to an ion exchange bath to form a glass-based article;
    wherein
        the glass-based substrate comprises a first surface and a second surface defining a thickness t, wherein t is greater than or equal to 0.2 mm to less than or equal to 0.65 mm;

the glass-based article comprises:
a peak tension PT of greater than or equal to 21 MPa and less than or equal to 60 MPa;
a compressive stress CS of greater than or equal to 650 MPa to less than or equal to 1200 MPa
a depth of layer of a spike $DOL_{SP}$ of greater than or equal to 4.5 μm to less than or equal to 12.0 μm; and
a compressive stress at a knee $CS_K$ of greater than or equal to 15 MPa to less than or equal to 150 MPa;
a stress-depth integral in a tensile stress zone A, and A/(PT*t) is greater than or equal to 0.4 and less than or equal to 0.71; and
the ion exchange bath comprises potassium and sodium.

12. The method of claim 11, wherein the method does not include any additional ion exchange treatment.

13. The method of claim 11, wherein the ion exchange bath is at a temperature of greater than or equal to 370° C. to less than or equal to 450° C.

14. The method of claim 11, wherein the ion exchange bath comprises $NaNO_3$ in an amount greater than or equal to 1 wt % to less than or equal to 10 wt %.

15. The method of claim 11, wherein the exposing extends for a period of greater than or equal to 15 minutes to less than or equal to 200 minutes.

16. The method of claim 11, wherein the glass-based substrate comprises a ratio of the molar concentration of $Li_2O$ to the molar concentration of $Na_2O$ of less than or equal to 2.0.

17. The method of claim 11, wherein the glass-based substrate comprises a $Li_2O$ concentration of less than or equal to 12 mol %.

18. The method of claim 11, wherein the glass-based article has a weight gain of less than or equal to 1% when compared to the glass-based substrate.

19. A glass-based article, comprising:
a first surface and a second surface defining a thickness t, wherein t is greater than or equal to 0.2 mm to less than or equal to 0.65 mm;
a peak tension PT of greater than or equal to 21 MPa and less than or equal to 60 MPa;
a compressive stress CS of greater than or equal to 650 MPa to less than or equal to 1200 MPa;
a depth of layer of a spike $DOL_{SP}$, wherein $DOL_{SP}$/t is greater than or equal to 0.007 to less than or equal to 0.030;
a compressive stress at a knee $CS_K$ of greater than or equal to 15 MPa to less than or equal to 150 MPa; and
a stress-depth integral in a tensile stress zone A, and A/(PT*t) is greater than or equal to 0.4 and less than or equal to 0.71.

20. A method comprising:
exposing a glass-based substrate to an ion exchange bath to form a glass-based article;
wherein:
the glass-based substrate comprises a first surface and a second surface defining a thickness t, wherein t is greater than or equal to 0.2 mm to less than or equal to 0.65 mm;
the glass-based article comprises:
a peak tension PT of greater than or equal to 21 and less than or equal to 60 MPa;
a compressive stress CS of greater than or equal to 650 MPa to less than or equal to 1200 MPa;
a depth of layer of a spike $DOL_{SP}$, wherein $DOL_{SP}$/t is greater than or equal to 0.007 to less than or equal to 0.030; and
a compressive stress at a knee $CS_K$ of greater than or equal to 15 MPa to less than or equal to 150 MPa;
a stress-depth integral in a tensile stress zone A, and A/(PT*t) is greater than or equal to 0.4 and less than or equal to 0.71; and
the ion exchange bath comprises potassium and sodium.

* * * * *